United States Patent
Berstis et al.

[11] Patent Number: 6,115,030
[45] Date of Patent: Sep. 5, 2000

[54] TRACKPOINT DEVICE

[75] Inventors: Viktors Berstis, Austin, Tex.; Thomas Guthrie Zimmerman, Cupertino, Calif.

[73] Assignee: International Business Machines Corporation, Armonk, N.Y.

[21] Appl. No.: 08/993,509

[22] Filed: Dec. 18, 1997

[51] Int. Cl.[7] ..................................................... G09G 5/00
[52] U.S. Cl. ........................ 345/161; 345/158; 345/168
[58] Field of Search .................................. 345/174, 156, 345/161, 168, 157, 164; 341/2; 364/190; 73/628, 862.05; 361/283.2; 200/600; 346/90; 338/68

[56] References Cited

U.S. PATENT DOCUMENTS

| | | |
|---|---|---|
| 3,270,260 | 8/1966 | Mehr . |
| 4,493,219 | 1/1985 | Sharp et al. . |
| 4,719,538 | 1/1988 | Cox . |
| 4,736,076 | 4/1988 | Mochizuki et al. ..................... 200/600 |
| 4,782,327 | 11/1988 | Kley et al. ................................... 341/2 |
| 5,006,952 | 4/1991 | Thomas ................................ 361/283.2 |
| 5,479,191 | 12/1995 | Komatsu . |
| 5,659,334 | 8/1997 | Yaniger et al. .......................... 345/156 |
| 5,786,997 | 7/1998 | Hoyt et al. ................................. 346/90 |
| 5,949,354 | 9/1999 | Chang ........................................ 341/33 |

FOREIGN PATENT DOCUMENTS

| 8006711 | 1/1996 | Japan . |
| 8272524 | 10/1996 | Japan . |

OTHER PUBLICATIONS

Technical Disclosure Bulletin, vol. 28 No. 5 Oct. 1985, Smart Key, pp. 1859–1860.

Primary Examiner—Steven J. Saras
Assistant Examiner—Fritz Alphonse
Attorney, Agent, or Firm—Jeffrey S. LaBaw

[57] ABSTRACT

A capacitive sensor input device which includes a movable stud having a top portion for manipulation by a user and a conductive bottom portion is connected to a planar surface, such as a circuit board by means of an elastomeric, adhesive connector. A plurality of sensors are disposed on the planar surface. The respective capacitances between the conductive bottom portion and respective ones of the sensors are used as input to another electronic device, such as a computer, set top box or gaming device. As the capacitances change according to user manipulation of the movable stud elements of the user interface are moved correspondingly.

26 Claims, 10 Drawing Sheets

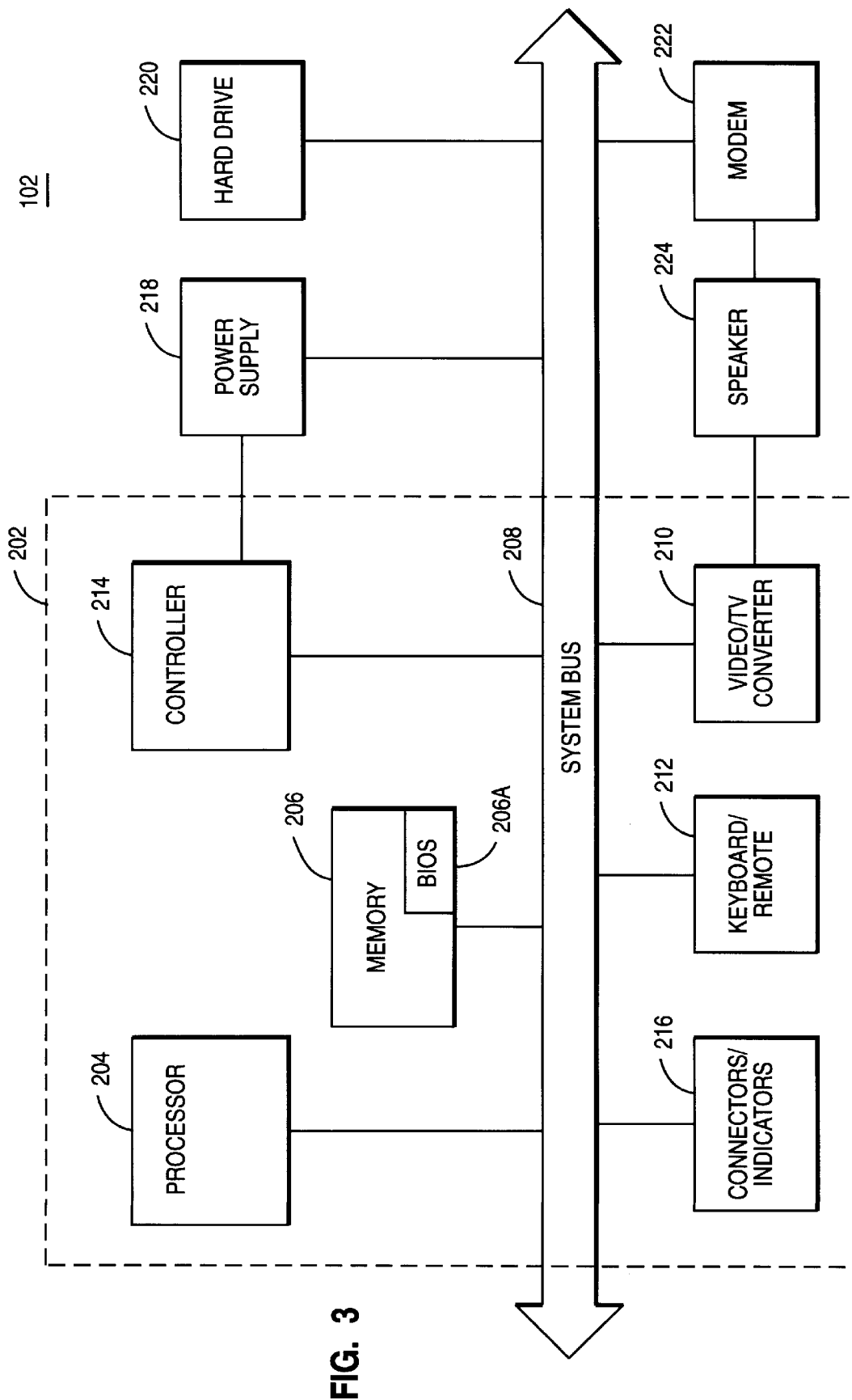

WITH GROUND PAD

TRACKPOINT DEVICE

BACKGROUND OF THE INVENTION

The invention relates generally to input devices for graphical user interfaces for computer systems. More particularly, it relates to an improved version of a pointing device known as a TrackPoint pointing device (TrackPoint is a registered trademark of the IBM Corporation).

It is common manipulate computer graphical user interfaces (GUI) with pointing devices as well as keyboard devices. Mice have been the most commonly used pointing device for user manipulations of computer GUIs. Using a mouse, a user directs the movement of a pointer icon across the user interface by corresponding manual mouse movements. Selection of items within the interface is accomplished by actuating one or more buttons on the mouse.

Other pointing devices such as touch screen and joystick type devices have also been used. In particular, IBM Corporation's TrackPoint pointing device (hereinafter "TrackPoint-type device" or "TrackPoint device") has been mounted in the keyboards in many laptop computers. A TrackPoint-type device includes a button-like structure resembling a pencil eraser and is located between keys of a computer keyboard. The Trackpoint device has eased the use of graphical user interfaces (GUIs) in portable computers. The necessity for a mouse and a flat working surface on which the user manipulates the mouse are eliminated, as the user is able to manipulate the TrackPoint device entirely within the keyboard.

The growing interactiveness of home entertainment systems, particularly cable television, interactive television and Internet set-top boxes, is placing greater demands on hand-operated controls. In particular, the Internet has become a cultural fixture as a source of both information and entertainment. Accessing the Internet and, in particular, the World Wide Web has become an increasingly common use of a data processing system. While personal computers are typically used to access the Internet today, some of which have keyboards equipped with a TrackPoint device, the largest segment of the consumer public does not currently have access to these resources. The internet appliance, web PC, internet access device, browser box, set-top box are all names for the same class of machine with minor variations. In particular, the class of machine is a low cost data processing system that hides the operating systems. Many of these new data processing systems run a microkernal operating system and platform independent software written in an interpreted language such as Java. The hardware cost of these machines is minimized. In theory, an NC can perform any function a PC does, except it will cost less for the hardware and software.

The emphasis in these types of devices is simplicity, both for cost reasons and for ease of use. Thus, many of the set top boxes do away with the keyboard and mouse altogether replacing them with a single handheld remote control. The remote control is used to access Internet sites from business, government or other organizations by manipulating buttons and other controls on the remote. While arrow buttons can be used, it would be desirable to incorporate a pointing device into the remote. Given that the remote is hand held, and in the case of a set top machine, the user not likely to have a flat, clean work surface nearby, a mouse is not a good choice. While trackballs or touch screens could be used, the inventors believe that a TrackPoint device would be most suitable. There are, however, a number of problems with conventional TrackPoint devices.

A primary one is cost. A conventional physical implementation of the TrackPoint III pointing device is described in copending, commonly assigned U.S. patent application Ser. No. 08/181,648, filed Jan. 4, 1994. That implementation includes strain gauge sensors and a post serving as a lever arm. By manipulating the post, the user flexes the strain gauges. Small analog signals produced by the strain gauges are interpreted by on-board software, and the cursor is moved accordingly.

The strain gauges must be individually trimmed during manufacture to match their outputs. The manufacturing and trimming of the strain gauges, combined with the small analog signal that they produce, contribute to the cost of the sensor, and of the electronics required to make a TrackPoint III system. Moreover, the small full-scale magnitude of the signal change places a burden on the data acquisition system which processes the strain gauge signals into cursor movement signals.

Therefore, an important objective in the design and manufacture of TrackPoint type devices is the reduction of these cost-adding factors. This particularly true for devices such as a remote control or a set top device intended for the mass market. However, the device described below can lower the cost of any device, even top of the line laptop computers, which utilizes TrackPoint type devices.

These issues have been confronted in the design and manufacture in copending, commonly assigned patent application Ser. No. 08/735,482, filed Oct. 23, 1996 entitled "Capacitive Pointing Stick Apparatus for Symbol Manipulation in a Graphical User Interface" to T. Zimmerman which is hereby incorporated by reference. One embodiment of the invention in that patent is shown in a cross sectional view in FIGS. 1A and 1B. A conductive cone 22 is suspended above the sensing electrodes 30 by the articulating member 20. The articulating member 20 includes a shaft 24, oriented along a vertical axis, and having a top 26 for user fingertip manipulation. Also, an immobile support member 35 is coupled to the shaft 24 by a flexible member 32. The support member 35 is annular, as shown in FIG. 1B, and preferably has a plurality of anchoring posts 37, which are inserted into apertures in the board 28, to anchor the support member 35 in place.

The cone 22 is coupled to the bottom of the shaft 24, to move therewith, responsive to user fingertip manipulation. Narrow gaps 33 exist between the surface of the cone 22 and the sensors 30. Forces normal (x and y) and parallel (z) to the shaft 24 may be measured by the illustrated apparatus. The gaps 33 between the entire conductive cone 22 and the electrodes 30 (typically 0.01 inch at zero force), in combination with the articulating member 20, allow three dimensional movement of the conductive cone 22 by forces applied to the shaft 24. The flexible member 32 provides the restoring force, and is preferably shaped as an arch, to distribute the stress and keep the stress well within the elastic limit of the material. The thickness of the flexible member 32, the length of the shaft 24, and the modulus of the material contribute to the sensitivity and maximum force that can be measured.

A typical articulating member 20, is constructed of plastic, such as nylon, with a 0.4 inch long shaft and a 0.01 inch wall flexible member 132, can operate over one million cycles when flexed with a 350 gram load. The anchoring posts 37 are also preferably made of a plastic material, such as nylon, which can be attached to the circuit board 28. The conductive cone 22 and articulating member 20 are injection molded parts, press-fit together. The cap 26 preferably has texturing to catch the skin of the finger, providing a "grippy" high friction top.

However, despite its benefits from a cost standpoint, the manufacture and use of this design has proved to be troublesome. The inventors had difficulties trying to reduce hysteresis and maintaining consistent sensitivity of the capacitative TrackPoint sensor made of two plastic parts. Nor did this design prove durable; the two parts can be broken apart by excessive user force causing sensor damage. Furthermore, excessive force causes the flexible parts of the plastic to fatigue changing the properties of the sensor. Thus, the TrackPoint loses calibration. Another problem caused by the introduction conductive material into the plastic (to provide a ground) exacerbates some of the above problems due to the change in the properties, particularly the flexibility, of the plastic.

All of the problems above led the inventors to design a more durable and inexpensive trackpoint device as described below.

SUMMARY OF THE INVENTION

Therefore, it is an object of the invention to reduce the cost of a TrackPoint type device.

It is another object of the invention to improve the durability of a capacitive type of TrackPoint device.

It is another object of the invention to improve the hysteresis of a capacitive type of TrackPoint device.

It is another object of the invention to provide a low cost input device for a wide range of computing devices.

It is another object to the invention to simplify the manufacturing process for building a TrackPoint device.

These and other objects are accomplished by a capacitive sensor which includes a movable stud having a top portion for manipulation by a user and a conductive bottom portion which connected to a planar surface, such as a circuit board by means of an elastomeric, adhesive connector. A plurality of sensors are disposed on the planar surface. The respective capacitances between the conductive bottom portion and respective ones of the sensors are used as input to another electronic device, such as a computer, set top box or gaming device. As the capacitances change according to user manipulation of the movable stud elements of the user interface are moved correspondingly.

BRIEF DESCRIPTION OF THE DRAWINGS

These objects, features and advantages will be more readily understood with reference to the attached figures and following description.

FIG. 3 is an architectural diagram of the data system depicted in FIGS. 2A–2D.

DETAILED DESCRIPTION OF THE DRAWINGS

The invention may be incorporated in the input devices of a variety of computers. As noted above, it is relatively common to incorporate TrackPoint devices into the keyboards of laptop computers. Alternatively, the computer could be, a personal computer, a mini computer, mainframe computer or a computer running in a distributed network of other computers. Computers in the IBM PC series of computers use the present invention. One operating system which an IBM personal computer may run is IBM's OS/2 Warp 4.0. In the alternative, the computer system might be in the IBM RISC System/6000™ line of computers which run on the AIX™ operating system.

Figure 1A:
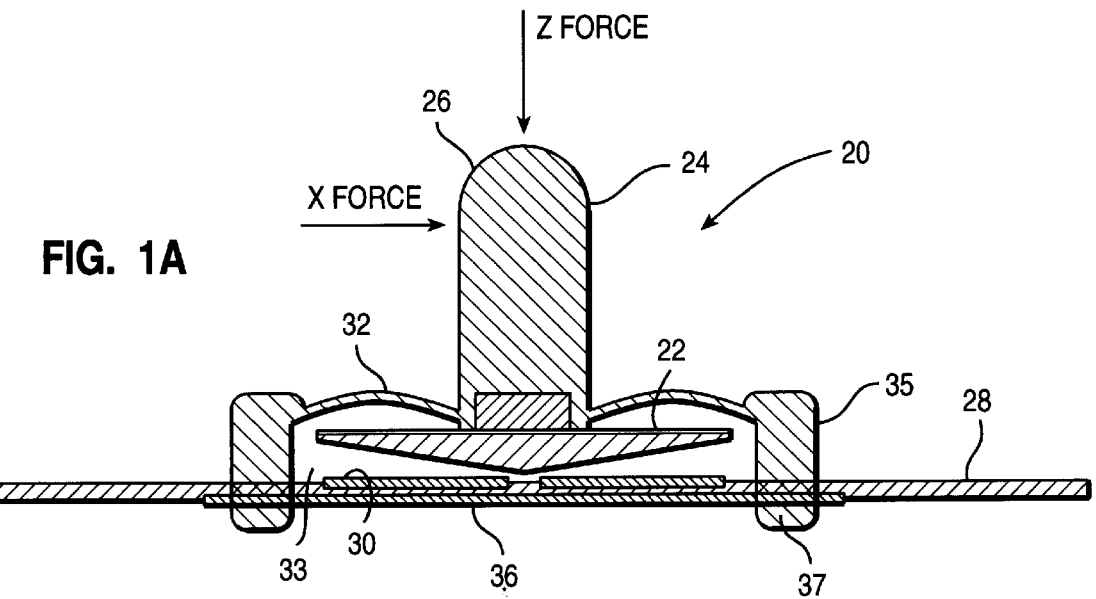
FIG. 1A is a side cross-sectional view of a prior art version of a capacitive TrackPoint device.
Figure 1B:
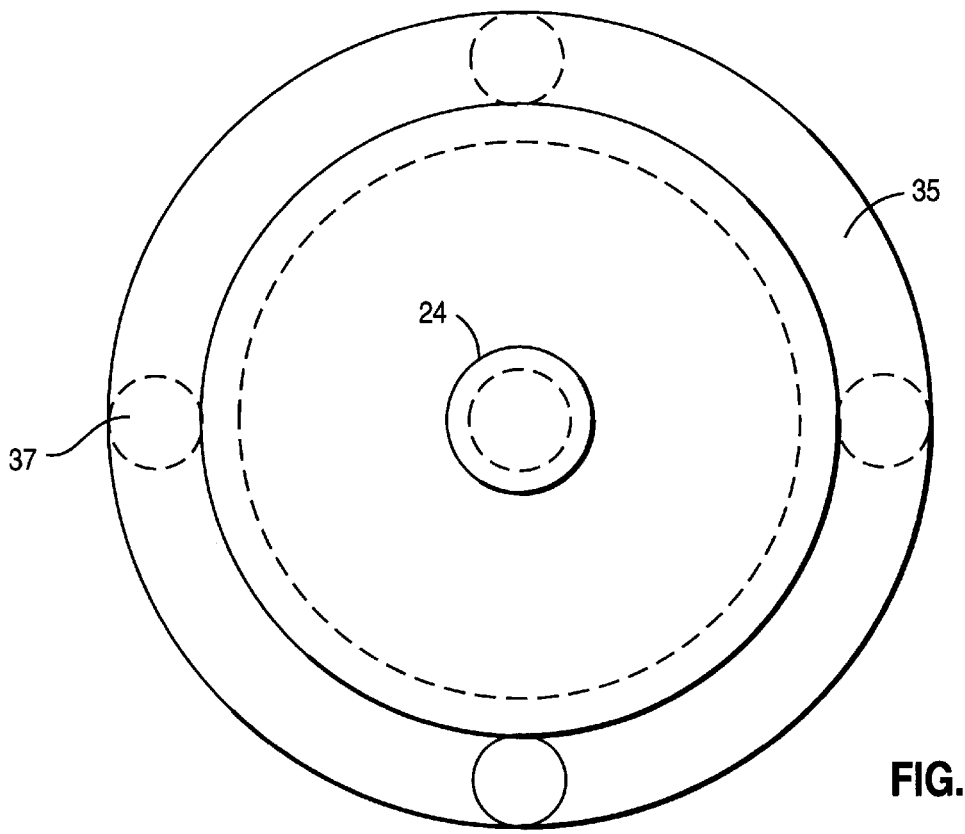
FIG. 1B is a top cross-sectional view of a portion of the TrackPoint device of FIG. 1A.
Figure 2A:
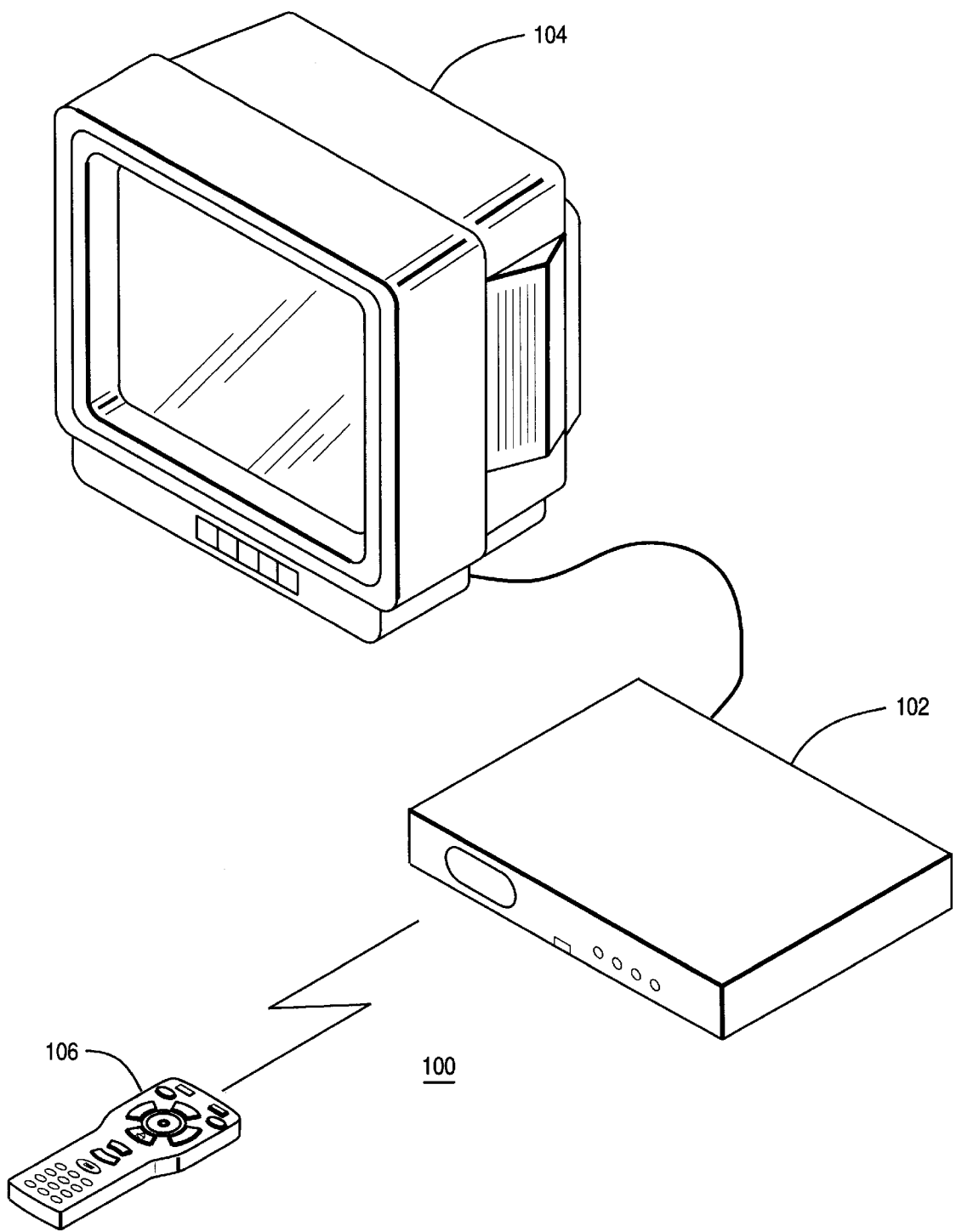
FIGS. 2A–2D are pictorial representations of a data processing system in which the present invention may be implemented.

However, as described above, one of the primary motivators for developing the present invention was for incorporation in a remote control of a set top type computing device. With reference to FIGS. 2A–2D, various pictorial representations of a set top data processing system in which a preferred embodiment of the present invention may be implemented are depicted. FIG. 2A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106, equipped with the present invention, allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

Figure 2B:
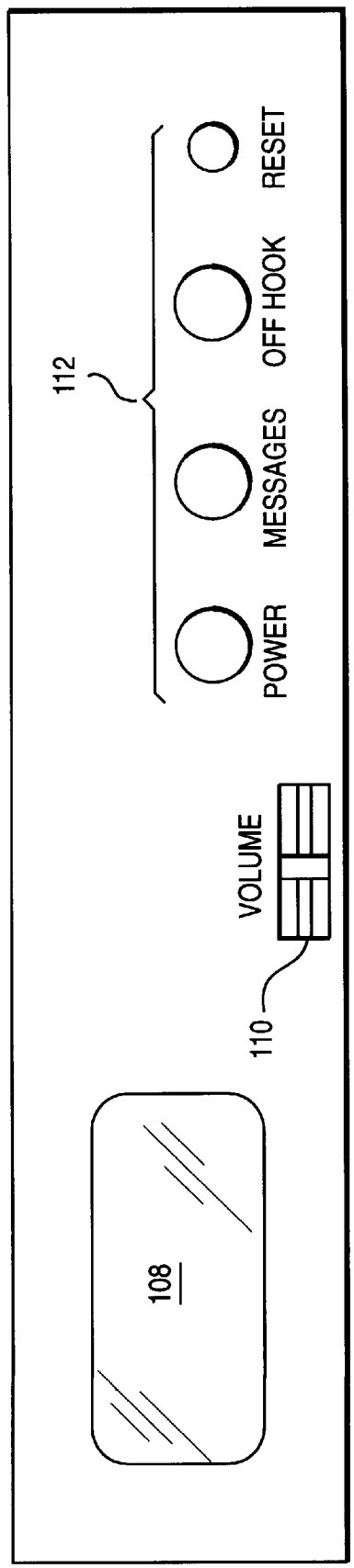

FIG. 2B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 2C:
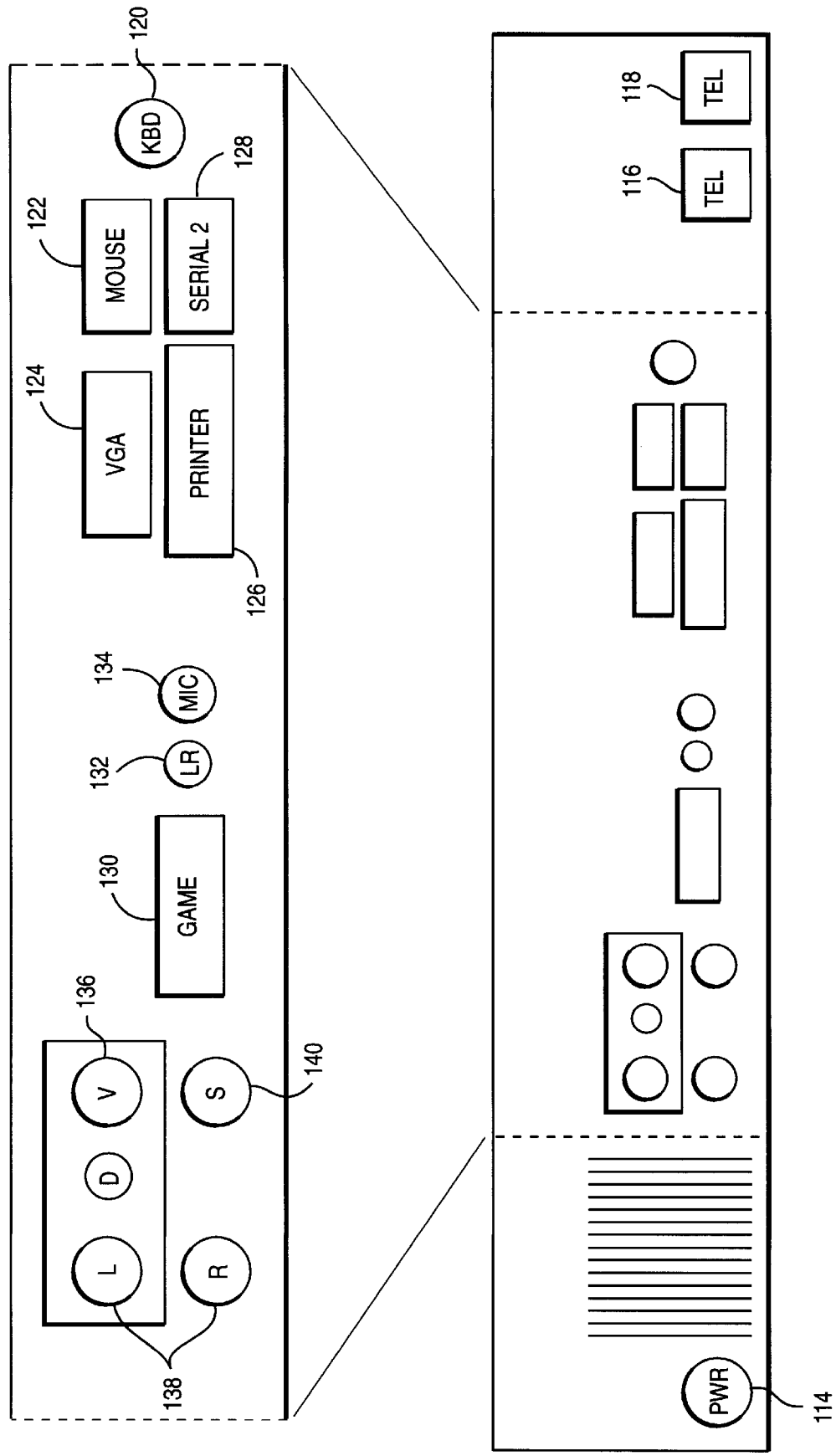

FIG. 2C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device. Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel ¾ modulator (not shown) may be connected in-line with the antenna connection.

Figure 2D:
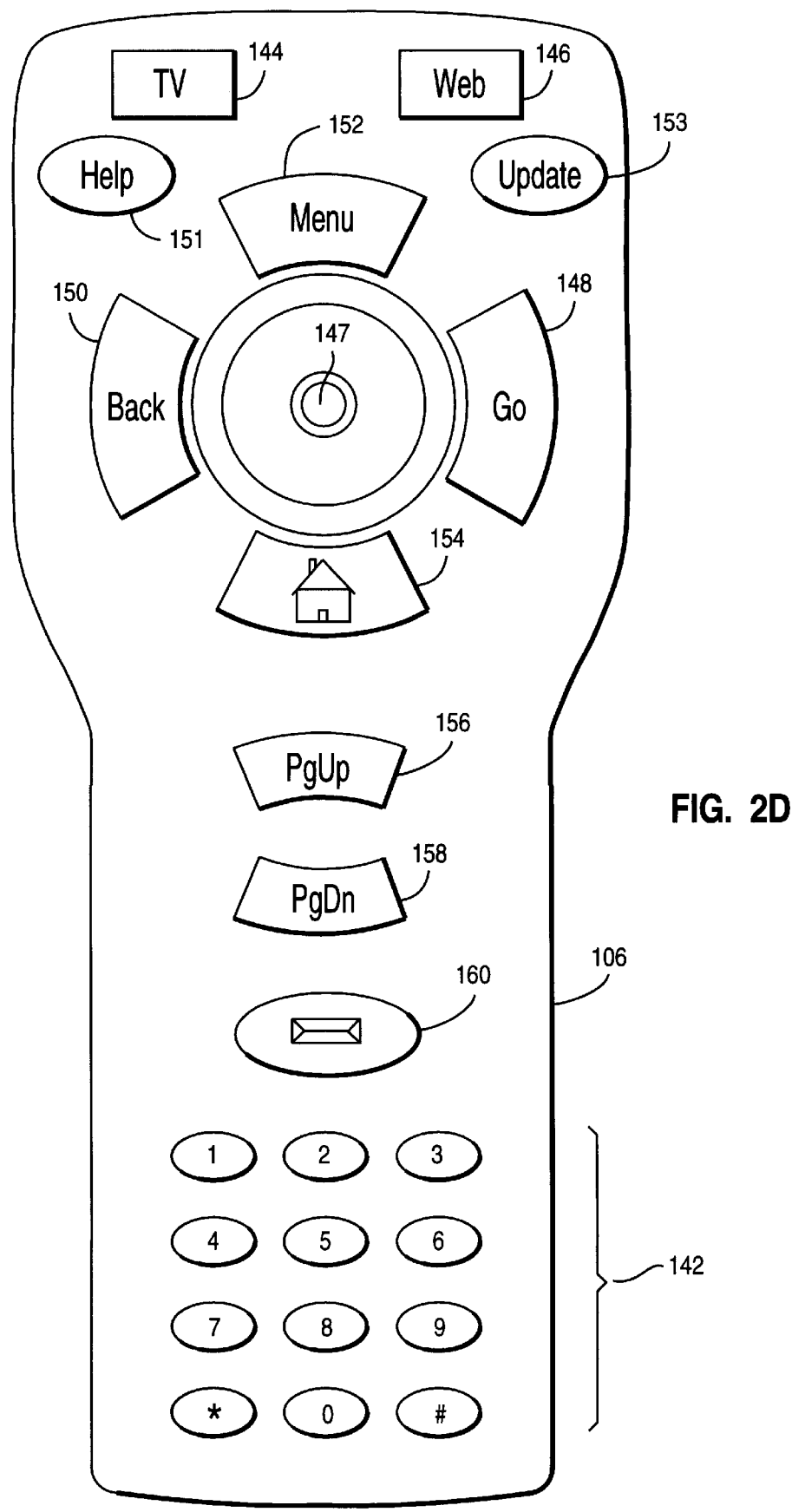

FIG. 2D is a pictorial representation of remote control unit 106 in accordance with a preferred embodiment of the present invention. Similar to a standard telephone keypad, remote control unit 106 includes buttons 142 for arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. A pointing device, which is preferably the TrackPoint device of the present invention, is included on remote control unit 106 and allows a user to manipulate a cursor on the display of television 104. "Go" and "Back" buttons 148 and 150, respectively, allow a user to select an option or return to a previous selection. "Menu" button 152 causes a context-sensitive menu of options to be displayed, while home button 154 allows to user to return to a default display of options. "PgUp" and "PgDn" buttons 156 and 158 allows the user to change the content of the display in display-sized blocks rather than by scrolling. The message button 160 allows the user to retrieve messages. In addition to, or in lieu of, remote control unit 106, an infrared keyboard (not shown) with an integral pointing device may be used to control data processing unit 102. The integral pointing device is preferably a TrackPoint pointing device of the present invention. A wired keyboard (not shown) may also be used through keyboard connection 120 and may also incorporate a TrackPoint type device therein. A wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Referring now to FIG. 3, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 208. Processor 205 is preferably at least a 486 processor operating at or above 100 MHz. Memory 206 includes read only memory (ROM) 206a containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors/indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation in Armonk, N.Y.; Windows 3.1, a product of Microsoft Corporation in Redmond, Wash.; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V.42bis, V34bis, V.34, V.17 Fax, MNP 1–5, and AT command sets.

Controller 214 is preferably one or more of the 805x family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shut off data processing unit 102 and signals that service is required through indicators 216. Thus data processing unit 102 is capable of self-recovery without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 2A–2D and 3 and described above may be varied for specific applications or embodiments. Such variations in which the present invention may be implemented are considered to be within the spirit and scope of the present invention.

The description which follows will describe an apparatus built according to the invention to be used in connection with a computer's user interface. However, it will be understood that televisions, specialized World Wide Web browsers for use with televisions or other home electronics, and other such electronic devices, may also make advantageous use of the invention.

Figure 4:
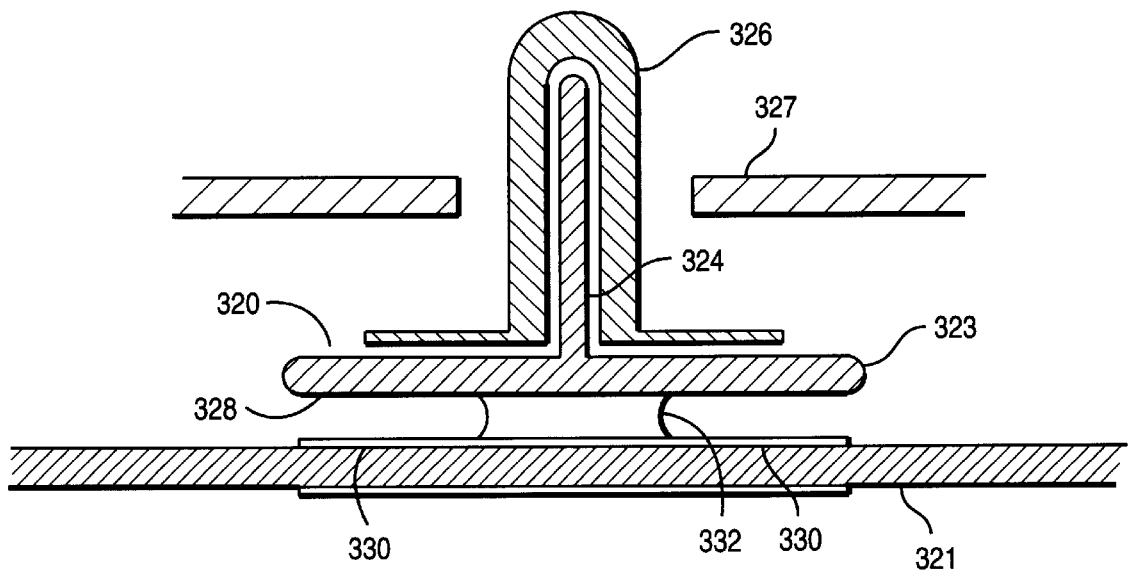
FIG. 4 is a side cross-section view of a first preferred embodiment of the invention.

As shown in FIG. 4, the two plastic parts of the prior art device are replaced with a simpler structure. A stud 320 is attached to a substrate 321 by means of an adhesive, elastomeric material such as silicone glue 322. The figure shows a cross-sectional side view of a preferred embodiment of the invention. A moveable stud 320 includes a conductive disk 323 coupled to a shaft 324 with a textured cap 326. An example of the cap may be found in co-pending, co-assigned U.S. patent application Ser. No. 08/315,651, filed Sep. 30, 1994, "Grip Cap for Computer Control Stick". The stud 320 produces a user-manipulable pointing stick device, having a look and feel similar to that of a conventional TrackPoint III device. The cap 326 protrudes through an opening in case 327 so that it may be manipulated by the user. As mentioned above the case could be for the remote control device, keyboard or other device such as a gaming device.

In an alternative embodiment, however, the shaft 324 and textured cap 326 can be replaced by a flat disk, which is pressed by the user.

The conductive disk 323 preferably has a flat, lower surface 328. However, conductive members of other shapes which would suggest themselves to persons skilled in the art for carrying out the invention may also be used. For example, the disk 323 could be a spherical dish about ¾ inch in diameter with the edge about 1/16 inch higher than the center when placed convex side down on a plane. The radius of curvature is about 1 to 1.5 inches. A conical lower surface is possible. While the stud 320 is metal in one preferred embodiment, a non-conductive material having a conductive layer on the lower surface 328 may also be used.

The substrate underneath the stud 320 is a circuit board 321, bearing a plurality of sensors, shown as sensing electrodes 330. The number of sensing electrodes 330 is preferably four, for detection of movement in two dimensions. However, other suitable numbers and arrangements of sensing electrodes 330 will be understood by persons skilled in the art as being suitable for other applications of the invention.

Figure 5:
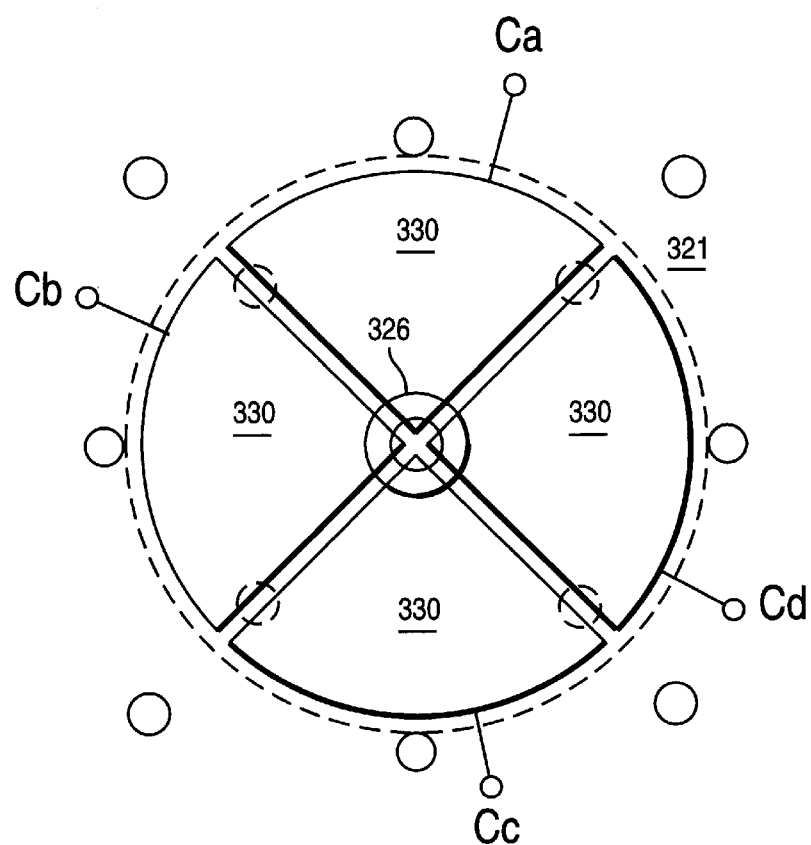
FIG. 5 is a top view of a portion of the embodiment of FIG. 4, showing the geometry of a set of sensing electrodes.

FIG. 5 provides a top view of the board 321, showing in detail a preferred layout of the sensing electrodes 330. The sensing electrodes 330 are arranged as four quadrants of a circle. The sensing electrodes 330 are preferably etched copper clad and electrically isolated from the stud 320 by a thin insulating layer, such as a solder mask or non-conductive tape (not shown). The outer periphery of the stud shown in the figure as a dashed line is substantially equal to the outer peripheries of the sensing electrodes 330.

Referring back to FIG. 4, the stud 320 is mechanically coupled to the board 321 by means of an elastomeric material such as silicone glue 322. In one preferred embodiment, the stud is glued between the circuit board sensors 330 using a controlled amount, e.g., about 1/50 of a cubic centimeter, of the elastomeric adhesive. The adhesive used should be suitable for electronic applications. The General Electric Company makes a silicone adhesive RTV162 which has proved effective in the present invention. The General Electric Company also makes heat curable silicone adhesives RTV6424, RTV6445 and TSE322 which are suitable for the invention. Other elastomeric adhesives known to the art would be suitable, but silicone has particularly good properties and is the best known to the inventors. The resulting adhesive material is on the order of ⅛ to ⅜ inches in diameter with a thickness on the order of 5 to 12 mils, holding the lower surface 328 of the stud above the surface of the circuit board 321. By varying these dimensions and the amount of glue, a wide range of stiffness can be achieved as required for the application.

The silicone glue 322 shows little hysteresis, keeps the disk 323 at an essentially constant distance from the sensors 330 on the circuit board 321, while permitting the required amount of cantilever action for operation of the TrackPoint sensor. The stud 320 is installed in a neutral position, from which it is movable by user manipulation. The distances 333 between the bottom surface 328 and the sensor lands 330 determine the capacitance between the stud and respective sensors. A flat surface 328 close to the sensors 330 improves the sensitivity of measurement of capacitance of the device, however, it is most likely to contact the board 321, potentially causing a short in the capacitors or damage to the sensor. A spacer (not shown) can be placed at the peripheral edge of the disk 323 to protect the board. Alternatively, the movement of the shaft 324 can be controlled by the size of the hole in the case 327 from which the cap 326 protrudes. By limiting the amount of movement, contact of the lower surface 328 with the board 321 is avoided. From the discussion which follows, it will be seen that other shapes may equivalently be used. For example, a curved or conical lower surface can be used. These surfaces would avoid contact with the board at greater manufacturing expense and some loss of sensitivity.

When the user applies force to the cap 326, the silicone glue 322 pushes and pulls the stud 329 back to the neutral position, once released.

In the preferred embodiment, the adhesive material 322 is not conductive and adheres to a centrally located area of the pads 330 on circuit board 321. However, in an alternative embodiment, the adhesive material is mixed with a conductive material and adheres to an electrically grounded, conductive ground land 336 on the board 321.

When a force is applied a portion of the lower surface 328 is brought closer to one or more of the sensing electrodes 330 and another portion (on the opposite side) is moved further away from the opposing one or more sensing electrodes 330. The lower surface 328, the respective sensing electrodes 330, and the distances 333 between create four variable capacitors. The values of the variable capacitors depend on the distance between the lower surface 328 and the respective sensing electrodes 330, i.e. on the dimensions of the gaps 333. As the distance between the lower surface 328 and one of the sensing electrodes 330 decreases, the capacitance between the stud 320 and that one of the sensing electrodes 330 increases.

The arrangement of the four sensing electrodes 30, as per the illustrated preferred embodiment, is known as a quadrature detection arrangement. Quadrature detection allows two degrees of freedom, i.e. the x and y components of movement, to be measured.

As mentioned above, in the alternative embodiment, the elastomeric adhesive is conductive. As it is grounded to the ground pad, it effectively also grounds the conductive portions of the stud 320. The conductive ground pad and the grounded stud 320 shield the sensing electrodes 330 from electrical noise and stray capacitance that might otherwise effect sensor readings, such as fields introduced by the human hand or other electronic circuits nearby. The conductive ground pad and the conductive portions of the stud 320 also protect the sensing electrodes 330 and their associated electronics from high voltage electric discharge. In practice, however, it was found that the TrackPoint sensors were sufficiently shielded from stray capacitance by the casing of the remote. Adding conductive material can have deleterious effects of the physical properties of the adhesive, so the simpler nonconductive approach is preferred. Many devices on the remote have electrostatic discharge protection diodes already built into them, offering a measure of protection from electrostatic shock.

Changes in capacitance are preferably measured by incorporating each of the sensing electrodes 330 into a respective RC oscillator. The resultant RC time constant, and therefore, the frequency of oscillation, is a function of the capacitance between the lower conductive surface 328 and the respective sensing electrodes 330.

Figure 6:
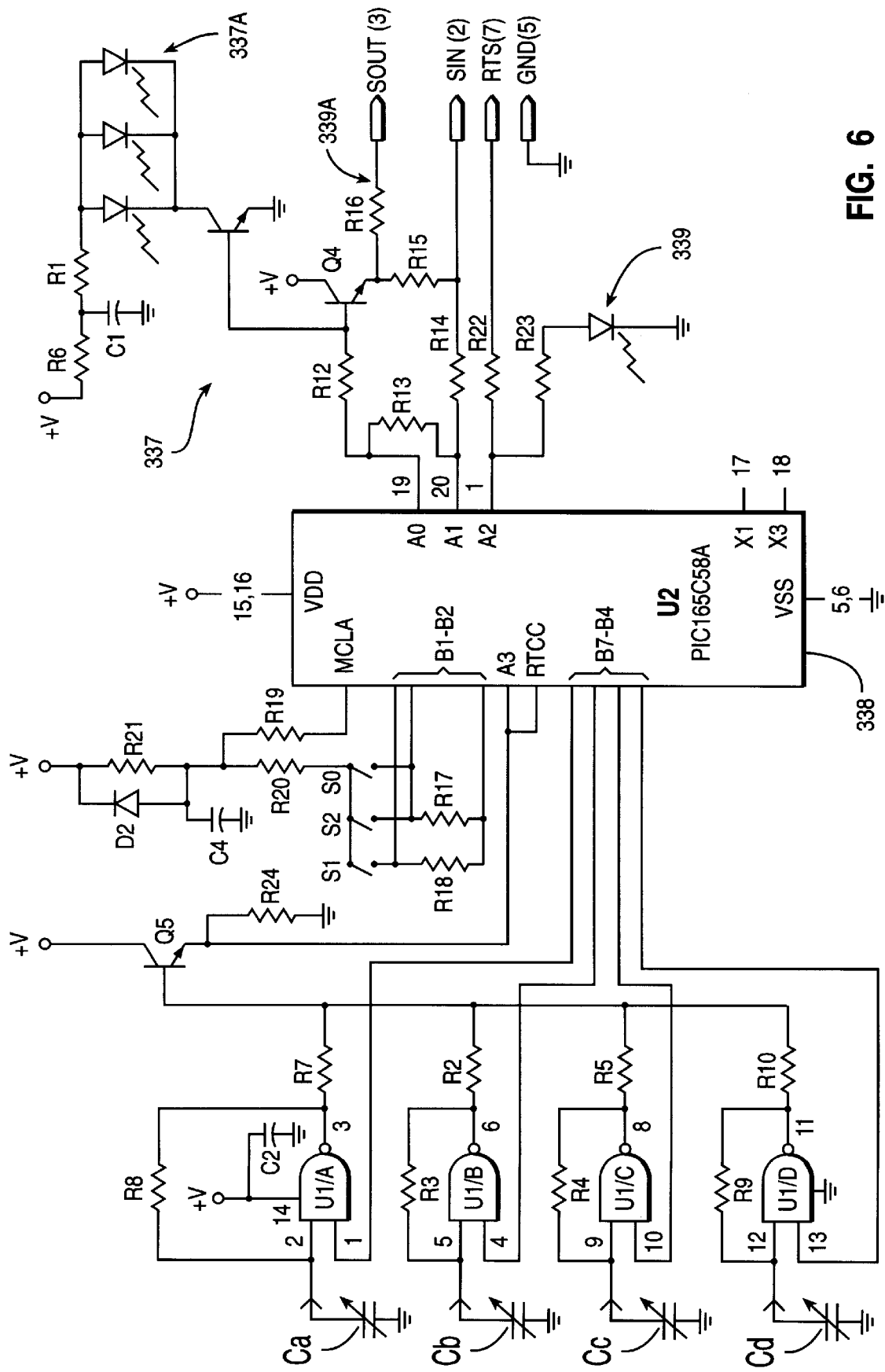
FIG. 6 is an electrical schematic diagram of circuitry for the embodiment of FIG. 4.

Referring now to FIG. 6, an electrical schematic of a preferred embodiment of circuitry is shown for utilizing the capacitances provided by the present invention. The four sensing electrodes 330 of FIGS. 4 and 5 are represented in FIG. 6 as variable capacitors Ca, Cb, Cc, and Cd. The ground of each of the sensing electrodes 330 is preferably that of the stud 320.

The variable capacitance values are used in combination with feedback resistors R8, R3, R4, and R9, and with NAND gates U1/A, U1/B, U1/C, and U1/D. These are preferably provided in a 74HC132 Schmitt-triggered input integrated circuit with the pinouts shown to create four oscillators and a sensor selector. Each NAND gate has two inputs, one serving as an oscillator input, e.g., the pin 2 input of the U1/A gate of the 74HC132 device, which is shown as coupled to the sensing electrode 330 represented as the capacitor Ca, and the other, e.g., the pin 1 input of the U1/A gate, serving as a selection control line. When the selection control line of one of the four NAND gates is high, i.e. the other three control lines being low, the selected oscillator will oscillate. The inventors found it important to run only one oscillator at a time in a round robin fashion. The oscillators had a pronounced tendency to lock in another oscillator's frequency impairing the accuracy of the TrackPoint device.

The outputs of the four NAND gate oscillators, e.g., pins 3, 6, 8, and 11 of the illustrated 74HC132 device, are ORed together by a transistor Q5, e.g., a 2N3906 PNP bipolar transistor. Suitable coupling, such as resistors R7, R2, R5, and R10, are provided. The output of the transistor Q5, the collector of the transistor Q5, thus produces a signal which oscillates at a frequency related to the capacitance of the selected sensing electrode 330.

The frequency of oscillation of the ORed result is counted by a microcontroller 338, preferably a PIC16C58A integrated circuit (pinouts shown). The microcontroller 338 runs calibration code that normalizes the gain of each of the four illustrated sensor circuits, producing a normalized force signal, compensating for component, mechanical and manufacturing tolerances.

Since the TrackPoint device is to emulate a conventional mouse pointing device which has displacement as an output, the microcontroller 338 performs a non-linear transformation on the normalized force signals to produce a displacement signal. The microcontroller 338 formats the signal value into a conventional mouse protocol and sends the signal out through an output such as a serial port (RS-232 or PS/2) 339, or an infrared (IR) port 337.

In the embodiment of FIG. 6, two types of communication interfaces, infrared (IR), generally shown as 337, and wired, generally shown as 339, are provided. Either or both may be used in implementations of the present invention.

In the IR interface 337, a high current transistor Q6, e.g., an FZT869, switches high-brightness infrared light emitting diodes 337A, e.g., HSDL4220, for infrared communication. In the wired interface 339, a low current switching transistor Q4, e.g., 2N3906, implements a serial RS-232 communication interface 339A.

In a preferred embodiment, the microcontroller 338 selects one of the NAND gate oscillators and counts the number of oscillations for a fixed period of time. The final count is proportional to the sensor frequency 380, and is used to determine the applied force.

The feedback resistors R8, R3, R4, and R9 are chosen for the maximum oscillation frequency countable by the microcontroller 338, typically less than 1 MHZ. Each sensor channel is integrated (oscillation counted) for 2.5 msec, resulting in a 100 Hz update rate of force direction and magnitude applied to the conductive cone 22. The implementation provides a 10 bit resolution sensor measurement signal with a full-scale change in excess of 25%.

Figure 7A:
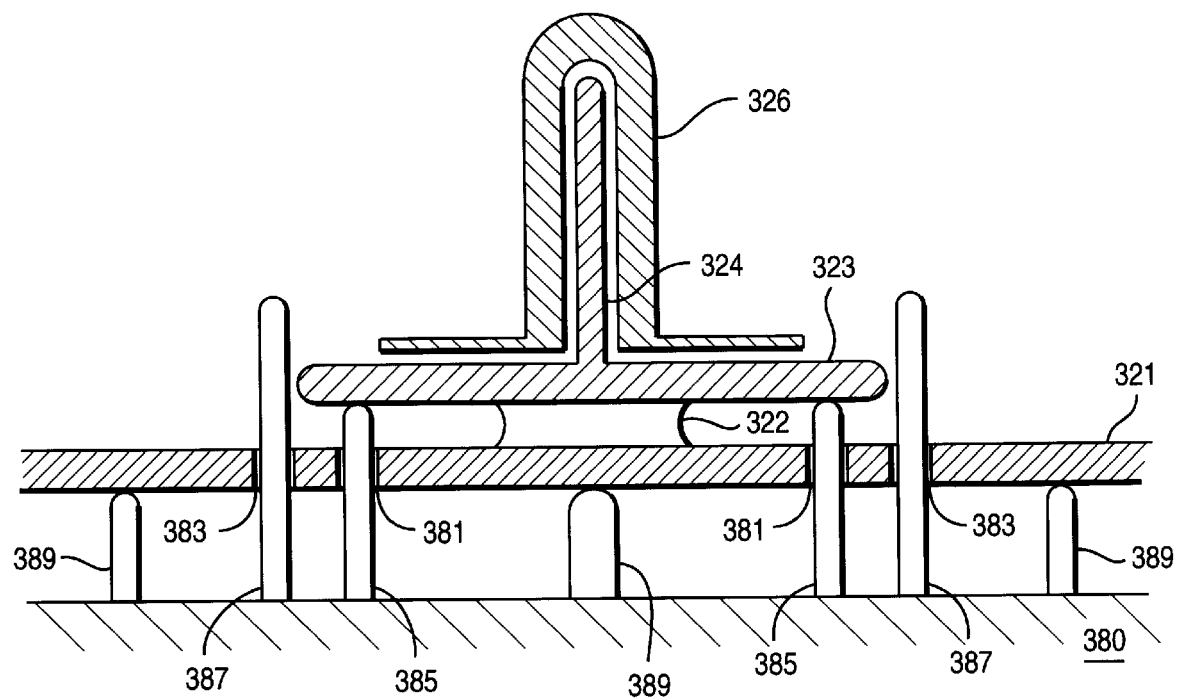
FIGS. 7A, 7B and 7C are views of a jig for manufacturing the TrackPoint device of the present invention.

A process for assembling the TrackPoint device of the present invention is discussed below with reference FIGS. 7A–C. It is assumed that the circuit board 321 on which the stud 320 is to be affixed has been fabricated with conventional processes known to those skilled in the art of circuit board manufacture. It is also assumed that the stud 320 itself has been previously manufactured.

The circuit board 321 is held by jig 380. In the circuit board 321, two sets of holes 381 and 383 have been made, preferably in nonconductive portions of the board. Through the first set of holes 381 protrude a first set of fingers 385 which support the stud 320. Through the second set of holes 383 protrude a second set of fingers 387 which align the stud 320 in the X-Y plane. The board 321 itself is supported by a third set of fingers 389. Prior to the stud being placed on the first set of fingers 385, a carefully measured volume of elastomeric adhesive is applied to the board 321. The desired distance 333 between stud 320 and board 321 is thus assured by the respective lengths of the first and third sets of fingers 385, 389. The X-Y position of the stud 320 on the board 321 is established by the second set of fingers 387.

Tiny holes (not shown) in appropriately spaced points on the spherical disk 322 assist in curing the glue faster. A heat cure can also be used to cure the adhesive more quickly. Smaller volumes of elastomer will cure more quickly. A 24 hour period is recommended for a full cure of the elastomer, however, if the assembly process is not overly violent, some of the curing of the elastomer can occur after the device is assembled. After the adhesive has cured sufficiently, about 2 to 5 hours without heat cure, the board 321 can be removed from the jig 380. The cap 326 is attached to shaft 324. Other elements such as the case and other keys (not shown) on the input device are also attached.

Figure 7C:
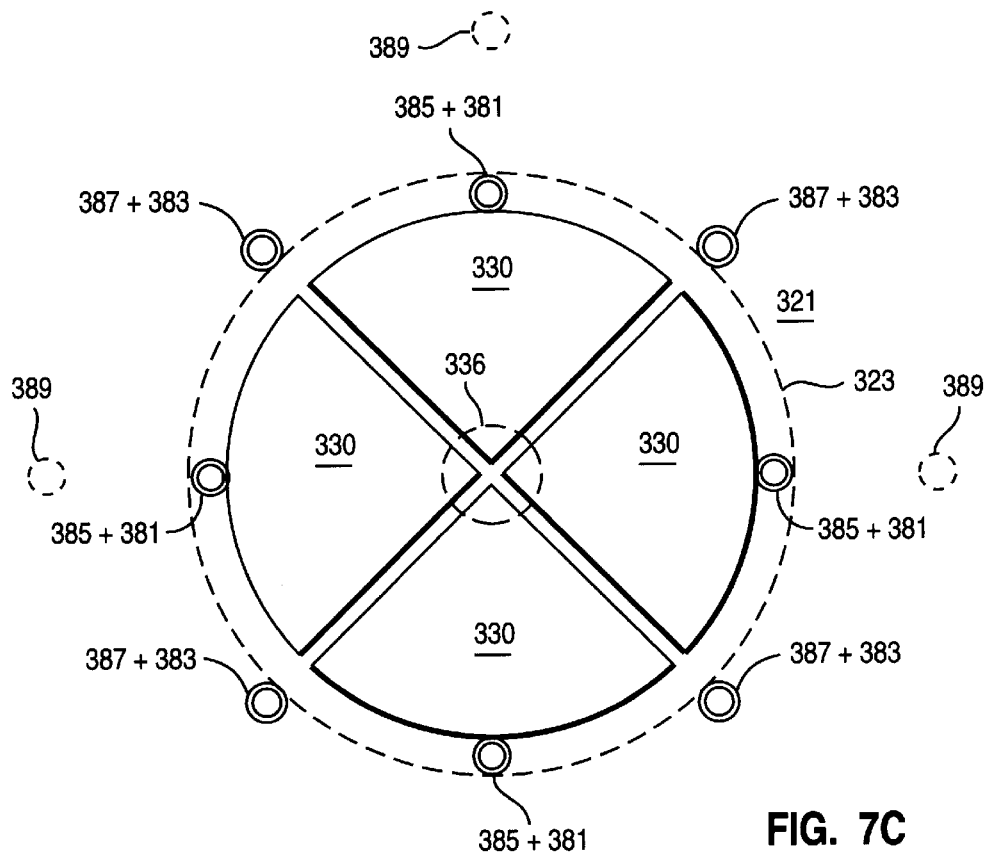
Figure 7B:
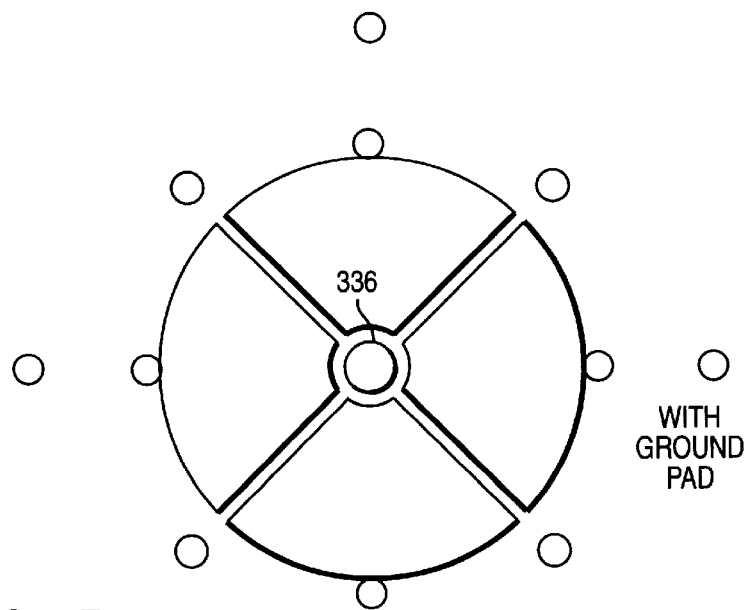

Referring to FIGS. 7B and 7C, prior to gluing the stud to the circuit board, the stud's surface to be glued and the region on the circuit board to be glued are prepared or processed with proper chemicals to clean the surfaces and maximize adhesion, according to the recommendations of the glue manufacturer. The circuit board is placed over a jig consisting of cylindrical fingers or "pins" arranged vertically as follows. Pins 389 touch the bottom of the circuit board establishing a reference point. Pins 387 go through holes 383 in the circuit board with sufficient length to keep stud 320 held in the proper horizontal position. Pins 385 pass through holes 381 in the circuit board the proper distance to hold the stud 320 the proper height above the capacitor plates 330 on the top surface of circuit board 321. A measured amount of glue 322 is deposited on ground pad 336 (in the conductive alternative) or in the center area 336 when there is no ground pad and the four capacitor corners converge. The stud 320 with or without eraser cap 326 is placed onto pins 381 and onto glue 323. While the glue is curing, some springs (not shown) may be used to hold the stud flush against pins 385 and springs may be used to hold the circuit board 321 flush against pins 389.

In assembling the remote, typically, the electronic components are soldered and/or installed onto the circuit board first. If the TrackPoint sensor is on a separate board, as described below, it may be installed as if it were another electronic component on the board. If it is installed directly onto the circuit board, the following steps apply. The eraser-like red rubber cover is placed over the TrackPoint sensor stud. However, if a heat cured glue is to be used, the rubber cover is placed over the stud after the curing process and after the stud has cooled down sufficiently to eliminate any danger of deforming the cover due to heat. Then, the TrackPoint sensor is glued into place over the capacitor plate lands on surface of the circuit board using the jig described above or other similar mechanism. The jig holds the stud the proper distance from the surface of the circuit board and also centered over the plates until the elastomer glue has sufficiently cured for further handling. Next, over the remote control assembly a flexible molded membrane including the remaining push buttons is placed over the circuit board. Then the circuit board with the membrane is placed into one half of the case shell for the remote control and the other half of the shell is snapped into place. Even though the snap locks firmly hold the two shells of the case together, a small screw may be used to further insure that the halves stay together.

Finally, a battery cover is installed. Any further curing of the glue can occur while the unit is in storage ready for shipment. While differing in some minor details associated with the other keys and controls present, the method for assembling a TrackPoint sensor in a keyboard or gaming device is similar.

While the jig described above is useful for mass production of the TrackPoint device, the inventors have successfully constructed the device of the present invention by hand. To build the proper disk to board spacing, spacers can be inserted at the periphery of the disk until the adhesive is sufficiently cured to hold the disk. Another option is to have a small needle like point protrusion from the center of the disk 322 to establish the proper spacing. When manufactured by hand, a cut o-ring makes a simple spacer at the periphery of the disk which can easily be removed when the glue is sufficiently firm.

Another alternative manufacturing method is to have the TrackPoint device premounted on its own miniature circuit board which is subsequently installed as a component on a larger board on which is directed mounted the button controls. In this way, the problems of attaching the TrackPoint device and other devices can be separated. It allows for different sequences of mounting the TrackPoint and soldering the other components in place. Because of the smaller size of the TrackPoint circuit board, different types of jigs can be developed which grab the movable stud from the side rather than have holes in the circuit board. The separate circuit board does have disadvantages in terms of cost since another part needs to be made. Also, the thickness of the remote can need to be increased since the TrackPoint circuit board is placed on top of the main board.

The improved TrackPoint device of the present invention has proved much more durable than its predecessor. The TrackPoint device and its elastomeric glue passed the following "ten pound" stress test. (However, the units are typically not tested in this way during production except to sample them to be sure the manufacturing process is within specifications.) A steel hook is placed over the stud approximately ⅛ inch down from the tip and attached to a force measurement device. Force is applied to the stud using this hook in a direction perpendicular to the stud, i.e. sideways, and increased up to 10 pounds. After holding this force for 2 seconds, the unit is tested for proper operation and should have substantially identical measured operational characteristics as prior to the test. The force can be applied in any radial direction.

Figure 8:
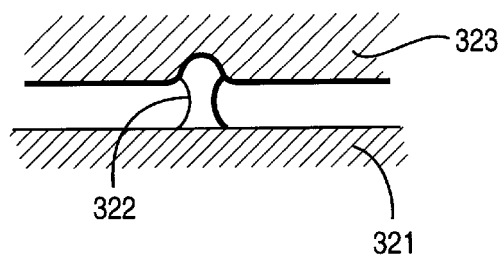
FIG. 8 is a side cross section view of an alternative stud shape.

In addition to the stud shapes described above, the stud could have a dimpled center as sown in FIG. 8. The dimpled center allows for a greater volume of elastomer to be applied while still keeping the bottom surface of the stud close to the sensor electrodes. This has the effect of a TrackPoint device with a softer feel while still keeping the sensitivity of the device.

In addition to its use in the remote control for a set top computing device and the keyboard of a computer, the TrackPoint device of the present invention is useful in a wide range of input devices. For example, the TrackPoint device may be utilized in a wired or wireless gaming device such as those manufactured ny the Sony, Sega and Nintendo companies.

While the invention has been shown and described with reference to particular embodiments thereof, it will be understood by those skilled in the art that the invention can be practiced, with modification, in other environments. Therefore, changes in form and detail may be made therein without departing from the spirit and scope of the invention as set forth in the accompanying claims.

We claim:

1. A capacitive sensor comprising:
    a movable stud having a top portion for manipulation by a user and a conductive bottom portion;
    a planar surface upon which a plurality of sensors are disposed, wherein respective capacitances between the conductive bottom portion and respective ones of the sensors, the capacitances changing according to user manipulation of the movable stud; and
    an elastomeric, adhesive connector which affixes a central portion of the conductive bottom portion to the planar surface, wherein the connector functions to bring the movable stud to an upright position after manipulation by the user.

2. The capacitive sensor as recited in claim 1 wherein the elastomeric, adhesive connector is conductive and serves as a ground for the conductive bottom portion.

3. The capacitive sensor as recited in claim 1 wherein the capacitances of the sensors are used to control movement of a cursor on a display.

4. The capacitive sensor as recited in claim 1 wherein the conductive bottom portion is a flat surface.

5. The capacitive sensor as recited in claim 4 wherein the conductive bottom portion has a dimple in the central portion.

6. A input device for use with a computer graphical user interface comprising:
- a movable stud having a top portion for manipulation by a user and a conductive bottom portion;
- a planar surface upon which a plurality of sensors are disposed, wherein respective capacitances between the conductive bottom portion and respective ones of the sensors, the capacitances changing according to user manipulation of the movable stud; and
- an elastomeric, adhesive connector which affixes solely a central portion of the conductive bottom portion to the planar surface, wherein the connector functions to bring the movable stud to an upright position after manipulation by the user;
- wherein a cursor in the graphical user interface moves in accordance with user manipulation of the movable stud.

7. The input device as recited in claim 6 further comprising communication means to a computer for transmitting signals indicative of movement of the movable stud.

8. The input device as recited in claim 7 wherein the communication means is an IR transmitter.

9. The input device as recited in claim 7 further comprising a plurality of buttons the depression of which causes transmission of control signals to a computer.

10. A computer system including memory, processor and display, wherein a computer graphical user interface is presented on the display, comprising:
- an input device including a movable stud having a top portion for manipulation by a user and a conductive bottom portion and a circuit board upon which a plurality of sensors are disposed, wherein respective capacitances between the conductive bottom portion and respective ones of the sensors, the capacitances changing according to user manipulation of the movable stud wherein the movable stud is connected to the circuit board by means of an elastomeric, adhesive connector which affixes solely a central portion; of the movable stud to the circuit board, wherein the connector functions to bring the movable stud to an upright position after manipulation by the user;
- wherein a cursor in the graphical user interface moves in accordance with user manipulation of the movable stud.

11. The computer system as recited in claim 10 further comprising communication means from the input device to the computer system for transmitting signals indicative of movement of the movable stud.

12. The computer system as recited in claim 10 wherein the communication means is an IR transmitter.

13. The computer system as recited in claim 10 wherein the input device further comprises a plurality of buttons the depression of which causes transmission of control signals to the computer.

14. The computer system as recited in claim 10 wherein the circuit board is attached to the surface of a second circuit board which contains circuitry for a plurality of buttons the depression of which causes transmission of control signals to the computer.

15. A set top computer system including memory, processor and connectable to a television, wherein a graphical user interface is presented on the television, comprising:
- an input device including a movable stud having a top portion for manipulation by a user and a conductive bottom portion and a circuit board upon which a plurality of sensors are disposed, wherein respective capacitances between the conductive bottom portion and respective ones of the sensors, the capacitances changing according to user manipulation of the movable stud wherein solely a central portion of the movable stud is connected to the circuit board by means of an elastomeric, adhesive connector, wherein the connector functions to bring the movable stud to an upright position after manipulation by the user;
- wherein a cursor in the graphical user interface moves in accordance with user manipulation of the movable stud.

16. The computer system as recited in claim 15 further comprising communication means from the input device to the computer system for transmitting signals indicative of movement of the movable stud.

17. The computer system as recited in claim 15 wherein the communication means is an IR transmitter.

18. A gaming system including memory, processor and connectable to a television, wherein a game is presented on the television, comprising:
- an input device including a movable stud having a top portion for manipulation by a user and a conductive bottom portion and a circuit board upon which a plurality of sensors are disposed, wherein respective capacitances between the conductive bottom portion and respective ones of the sensors, the capacitances changing according to user manipulation of the movable stud wherein solely a central portion of the movable stud is connected to the circuit board by means of an elastomeric, adhesive connector, wherein the connector functions to bring the movable stud to an upright position after manipulation by the user;
- wherein an element of the gaming interface moves in accordance with user manipulation of the movable stud.

19. The gaming system as recited in claim 18 further comprising communication means from the input device to the computer system for transmitting signals indicative of movement of the movable stud.

20. The gaming system as recited in claim 18 wherein the communication means is an IR transmitter.

21. The gaming system as recited in claim 19 wherein the communication means is a wire.

22. A method for making a capacitive sensor device, comprising the steps of:
- applying a measured amount of an elastomeric, adhesive material to a circuit board upon which a plurality of sensors are disposed;
- centering a movable stud over the elastomeric, material so that solely a central portion of a conductive bottom surface of the movable stud contacts the elastomeric material and the conductive bottom surface is at a specified difference from the circuit board; and
- curing the elastomeric adhesive material;
wherein the capacitive sensor device in operation detects capacitances between the conductive bottom surface and the sensors according to user manipulation of the movable stud, and wherein the connector in operation brings the movable stud to an upright position after manipulation by the user.

23. The method as recited in claim 22 wherein the conductive bottom surface is flat.

24. The method as recited in claim 23 wherein the conductive bottom surface has a dimple at a point of contact with the elastomeric, adhesive material.

25. The method as recited in claim 22 further comprising the step of attaching the circuit board to another circuit board having circuitry for other control devices.

26. The method as recited in claim 22 further comprising the steps of:
   placing the circuit board in a jig; and
   placing the movable stud in the jig;
   wherein the distance and relative position of the movable stud and circuit board is established by the jig.

* * * * *

UNITED STATES PATENT AND TRADEMARK OFFICE
CERTIFICATE OF CORRECTION

PATENT NO : 6,115,030
DATED : September 5, 2000
INVENTOR(S) : Berstis, et al

It is certified that error appears in the above-identified patent and that said Letters Patent are hereby corrected as shown below:

Cover page, bracket [54], in the title please insert before 'TRACKPOINT" --IMPROVED--;
Column 1, line 1, in the title please insert before 'TRACKPOINT" --IMPROVED--;

Signed and Sealed this

Eighth Day of May, 2001

Attest:

NICHOLAS P. GODICI

Attesting Officer

Acting Director of the United States Patent and Trademark Office